United States Patent
Sarin

(10) Patent No.: US 11,240,030 B2
(45) Date of Patent: Feb. 1, 2022

(54) TOKEN MANAGEMENT LAYER FOR AUTOMATING AUTHENTICATION DURING COMMUNICATION CHANNEL INTERACTIONS

(71) Applicant: PAYPAL, INC., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 293 days.

(21) Appl. No.: 16/234,376

(22) Filed: Dec. 27, 2018

(65) Prior Publication Data

US 2020/0213114 A1 Jul. 2, 2020

(51) Int. Cl.
*H04L 9/32* (2006.01)
*H04L 9/08* (2006.01)

(52) U.S. Cl.
CPC .......... *H04L 9/3213* (2013.01); *H04L 9/0866* (2013.01); *H04L 9/3231* (2013.01)

(58) Field of Classification Search
None
See application file for complete search history.

(56) References Cited

U.S. PATENT DOCUMENTS

| | | | |
|---|---|---|---|
| 9,418,213 B1 * | 8/2016 | Roth | H04L 63/105 |
| 9,742,763 B2 | 8/2017 | Neuman et al. | |
| 10,686,600 B1 * | 6/2020 | Vo | H04L 9/3213 |
| 2004/0059590 A1 | 3/2004 | Mercredi et al. | |
| 2009/0119759 A1 * | 5/2009 | Taugbol | H04L 63/126 726/6 |
| 2009/0158394 A1 * | 6/2009 | Oh | G06F 21/31 726/3 |
| 2015/0127547 A1 | 5/2015 | Powell et al. | |
| 2017/0070498 A1 | 3/2017 | Fork et al. | |
| 2017/0171189 A1 * | 6/2017 | Byszio | H04L 63/101 |
| 2018/0337924 A1 | 11/2018 | Graham et al. | |
| 2019/0188696 A1 * | 6/2019 | Carpenter | G06Q 20/32 |
| 2019/0333055 A1 * | 10/2019 | Mohammed | G06Q 20/4014 |

\* cited by examiner

*Primary Examiner* — Peter D Nolan
*Assistant Examiner* — Roy Rhee
(74) *Attorney, Agent, or Firm* — Haynes and Boone, LLP

(57) ABSTRACT

There is provided systems and method for a token management layer for automating authentication during communication channel interactions. A user may contact an organization, such as an online service or payment provider through a first communication channel. During communications with the service provider, the user may provide authentication and/or personal information to step-up the users authentication and identity verification with the service provider. The service provider may provide a token management layer that stores the provided information with a tokenization system and allows the information to be provided for future authentication step-ups when the token is access and/or received. This may be due to additional communications by the user with the service provider, or may occur when the user contacts another service provider that is enrolled with the token management layer. The service provider may also issue other authentication tokens, such as voice authentication.

20 Claims, 6 Drawing Sheets

TOKEN MANAGEMENT LAYER FOR AUTOMATING AUTHENTICATION DURING COMMUNICATION CHANNEL INTERACTIONS

TECHNICAL FIELD

The present application generally relates to user authentication in electronic communication channels and more specifically to providing a common token management layer to automate authentication through shared data tokens.

BACKGROUND

Users may engage with organizations through electronic communication channels. For example, interactive voice response (IVR) systems provide a technology allowing a user to interact, such as receive and transmit data, with computer systems including networked servers. A server may also host the website, which may be used to exchange data with a user including providing a chat-based portal. However, IVR systems are constructed separate from website, call-in services, and other electronic communication pathways and channels. Thus, existing servers require implementation and integration of separate systems in order to offer different channels for user interactions. This leads to multiple user interactions with the system without having a way to track user data entered to the system through separate channels. Thus, the backend system processor may process multiple sets of instructions and provided user data, which wastes server resources and causes duplicative data input, requiring additional database storage. This also leads to user experience friction and frustration when the user is required to provide repetitive inputs of data when moving between different communication channels and/or service providers.

Figure 1:
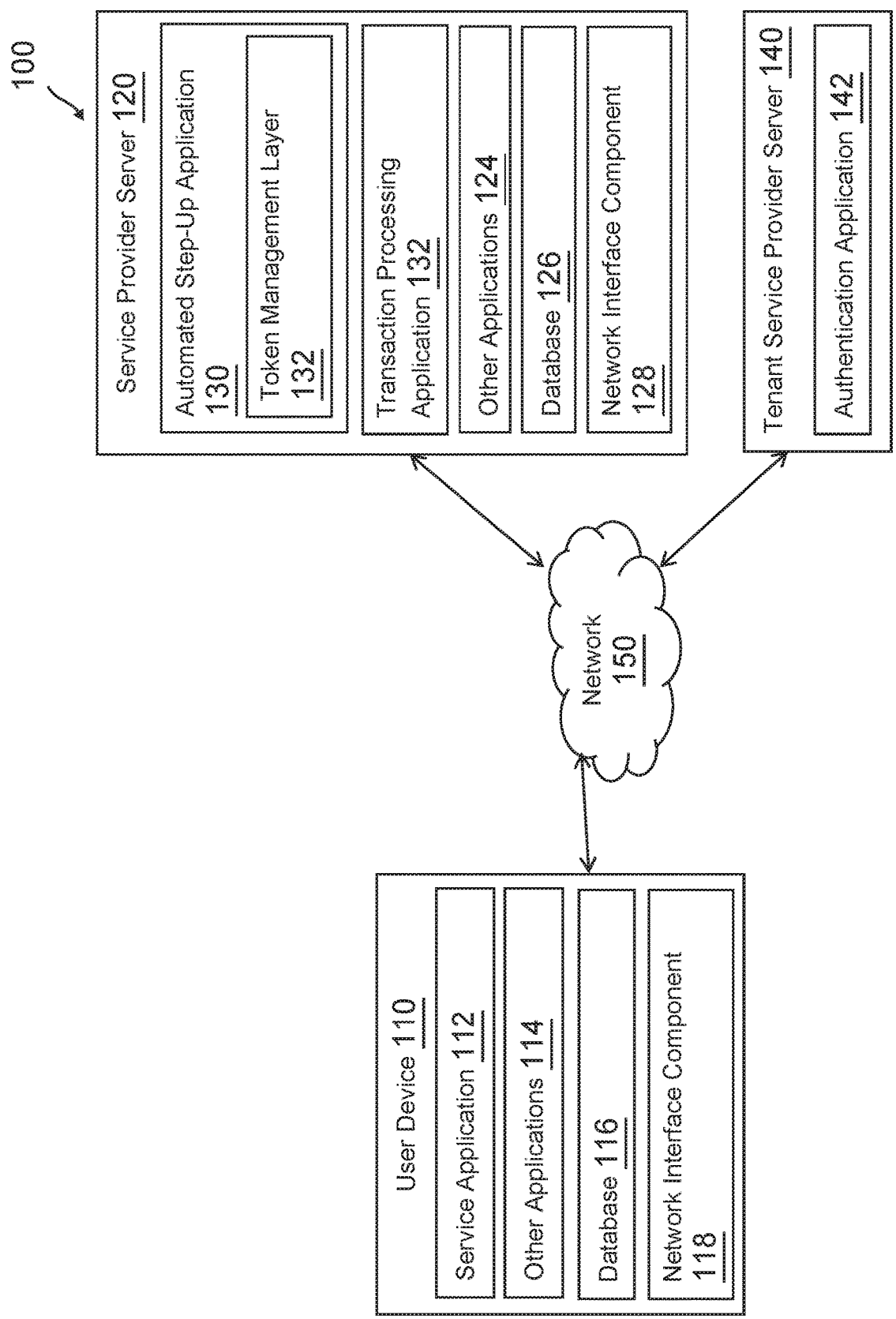
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Organizations, such as online transaction service providers or other types of service providers, may provide multiple electronic communication channels that allows users, such as customers of the service providers, to interact with the service providers. These communication channels may be to proceed with electronic transaction processing, resolve issues and seek help or assistance with services (e.g., through a customer care portal, help desk, or other assistance platform), or perform another action with the service provider. Each one of the channels provides a communication pathway that a user's device may utilize to browse available data, request data processing, and/or submit help queries or requests for assistance with a particular issue. However, each channel provides different data and services, and may have different hours of operation, processes for use by the user, availability of agents and systems to resolve issues, and other particular attributes. Thus, the user may "surf" or navigate between multiple channels when attempting to process some data and/or resolve an issue.

In this regard, when a user utilizes a computing device to access an electronic communication channel of a service provider's system, the system may require that the user provide authentication credentials, personal information, financial information, or other data during interaction with the system. This may be referred to as a "step-up" or an authentication and identification step-up of the user's identity, information, and/or authentication credentials so that the system may further verify that the user is who they say they are, that they have access or know the information, and/or that they possess the proper authentication credentials (e.g., username, password, personal identification number (PIN), or previously provided tracking identifier). This data provided by the user may allow the user to access additional data, confirm their identity to the system, and/or provide some process, such as electronic transaction processing, help resolution, etc. In some embodiments, the user data for the step-up may include personal information (e.g., a name, address, etc.), an authentication credential for an account of the user with the service provider, all or part of financial information (e.g., the last 4 digits of a payment card stored by the service provider), or other information. Once the data has been provided, the user's authentication may be stepped up so that the user is provided a higher level of clearance or authentication and the system provides a greater amount of trust in the user. Such step-up mechanisms are utilized in order to reduce risk of fraud or data misappropriation by the system through confirming that the user knows privileged data that should be known only to authorized users of the system.

The service provider system may also provide a token management layer and service configured to manage smart interoperable tokens with the service provider and other service providers. The common token management layer (CTML) serves to associate the provided authentication step-up data or other user data with a smart token based on one or more delegation rules and data sharing between each of the service providers utilizing the CTML (e.g., the data tenants of the CTML that may enroll or share in data sharing through the service provider's CTML). The CTML also manages data caching of provided user data, token issuance, token routing to the service providers and/or communication channels, and rule establishment. After receiving the user data for the requested step-up, the service provider system may store the user data and issue a token to the user data. The user data may be provided to the CTML by the user based on a preferred type of authentication by the user, such as a fingerprint, financial information, personal information, a password or PIN, or other information. The user data for authentication step-up may also be retrieved from a previous authentication by the user with the CTML's service provider. Additionally, the authentication data stored for the user and associated with the user's token may be specific to the particular tenant authentication and step-up needs of the user's other service providers that are tenants of the system. For example, the user may utilize a second service provider that requires bank account information for authentication step-up in a communication channel, which may be stored with the CTML. The token may become associated with the user data in a referential token database and reference tables accessible by the CTML and controlled/serviced by the CTML. The CTML may store various types of data necessary for authentication and step-up of a user based on user requirements for authentication, data provided by the user to the CTML and/or for authenticating a user in a communication channel, and/or authentication requirement of tenants that utilize the CTML for authentication step-up of the user.

A device fingerprint, user identity, phone number, or other user identifier may also be associated with the token and/or user data. In this regard, the token or other identifier is associated with the user, where the user has one or more types of authentication information stored in a database of the system. Thus, when the user contacts the system or another service provider's system, the token may be identified and provided to another communication channel to automatically authenticate and/or perform an authentication step-up of the user. One or more delegation rules may also be set and associated with the token, where the rules define the sharing of the token with other service providers and systems, and therefore manage the retrieval of the user data for one or service providers and/or communication channels. In other embodiments, the user data may be provided to the system through another communication pathway, such as data provided through an account where a token is issued to the account based on the data and additional information such as a user identity (e.g., phone number, device identifier, etc.). Thus, the token and associated user data may previously be established based on other communications and provided data instead of a first communication through a channel that requires user step-up during interactions.

At a future time, the user may contact another service provider through a communication channel that requires authentication of the user's data, such as a step-up procedure for personal, financial, or authentication information. The second communication channel may be a separate communication channel different from the first; however, in some embodiments, the communication channel may be the same as the previously used channel. Instead of requiring that the user enter the input again, which may be time consuming and require additional processing to confirm and verify, the CTML may automate providing, entering, and processing the required step-up information based on the required authentication in the second communication channel. The second communication channel may generate an authentication and/or step-up token that includes the required authentication request and includes metadata, device fingerprint or identifier, and other service provider data. The CTML may be availed based on the required step-up procedure, and the token for the user's data may be identified using a user identifier, device identifier or fingerprint, phone number, or other data provided during the second communication through the communication channel. Thus, the CTML may hand token issuance and routing of the authentication request token for processing by the CTML with the second communication channel and automating step-up of the user.

The CTML may verify the authentication request (e.g., the authentication token requesting the user) for the user data and may utilize the user data to automate the step-up. In some embodiments, the CTML may request a preferred type of authentication data from the user in response to detecting and verifying the step-up requirement for the tenant service provider of the CTML. The user may enter a preferred authentication credential for step-up, such as a fingerprint, personal information, or financial information, which may be provided to the CTML and verified. After verifying the preferred authentication information, the user's token may be determined and verified and the CTML may automate step-up with the tenant service provider. The CTML may determine the required step-up authentication information required by the tenant service provider, and may utilize the tokenized user data to automate step-up with the tenant service provider.

Thus, the CTML may verify the request for user or authentication data necessary for step-up that is associated with the user's token. In some embodiments, delegation and sharing rules may govern where the user data and user token is shared, such as the tenants of the CTML that may receive the token and use the token to load the corresponding user data to an authentication step-up process of the data tenants for the CTML. For example, other service providers may be tenants of the CTML and may receive the token with the corresponding user/device identifier, fingerprint, or other information. The service provider may identify the token using the user/device identifier provided during a communication. In response to the communication with the other service provider, the user data may be shared and/or loaded through a background process to the communication channel requesting the user data for step-up. The CTML may store one or more types of authentication information (e.g., user, device, financial, or other authentication data for an authentication process) for the user that is associated with the token and may be used to automate the step-up on behalf of the user with the service provider without the user entering the step-up data in the second communication channel.

The other service provider may also avail the user data stored by the CTML using the token previously provided to the service provider if the service provider has a delegated rule with the CTML that allows for data sharing of the token and/or user data with the service provider. The token may be provided to the other service provider prior to the user communicating with the second service provider based on rules for token and data sharing set by the CTML with the user's token and tenant usage of the CTML. In some embodiments, the CTML may be availed by the second service provider at the time of the communication to receive the user data used for authentication and step-up processes, where the token is provided to the second service provider's communication channel during the communication. Thus, the process may be automatically completed with another service provider using the CTML without the user being required to enter user data and/or process the step-up. In other embodiments, the CTML may perform the automated step-up of the user's identity or authentication using the data without directly sharing the data in the communication channel to protect against fraud, for example, by processing the step-up using tokenized and/or encrypted data with the service provider. Thus, once the token is loaded to the communication channel, the token may be used to fetch and load the associated user data into the step-up process in the communication channel automatically through a background operation without requiring the user to enter the requested information so that authentication of the requested user data is automated. This increases the speed of stepping up the user's authentication and reduces the number of required user inputs.

In some embodiments, the user may contact a service provider using a first communication channel and may then be guided to a second communication channel for issue resolution and/or data processing. For example, an IVR system may be called through a device of a user using a telecommunication channel. The IVR system may request the user to perform an authentication step-up, where the provided user data is associated with a token, as described herein. The IVR system may also issue a session identifier to the communication session in the first channel. The session identifier may also be associated with the token and/or the user data and stored by the CTML or other tokenization system. During interaction with the IVR system, the user may be guided to another channel, such as a chat bot using a web-based chat channel. The web-based chat channel may also require step-up of similar user data for authentication purposes. Instead of requiring the user to reenter the data, the chat bot and/or web-based chat channel may utilize a device identifier, fingerprint, or other identification information provided when initiating and performing the communication in the second channel to determine whether a token is available with the service provider's system, such as the CTML provided by that service provider or another. The data may also be availed from the CTML or other tokenization system through the session identifier assigned to the previous communication session and associated with the user data.

If available, the token/session identifier may be fed to the second channel, which may utilize the CTML to detokenize the user data from the token/session identifier using the CTML and token referential databases. The token/session identifier therefore may then be accessible between the channels, such as by being transferred or transmitted to the next channel and/or accessible by an agent or process in the next channel. When entering the next channel, a process may translate the user data into a processing language and/or data structure type that can be handled by the second channel. The second channel may then load the data into the required step-up process and authenticate the user. Additionally, the channel may utilize the data to skip one or more processes within the authentication process or load the user's data to that process so that the user does not need to repeat data entry and/or previously completed processes.

In some embodiments, the transfer of the user between channels may incur some delay, such as when the user hangs up from an IVR system and goes to access the web-based chat. In other embodiments, the user may end one communication interaction with the service provider system, either intentionally or accidentally, and may contact the service provider again through the same channel after some amount of time. In such embodiments, the CTML and token identified using the identifier/fingerprint may be utilized to automatically step-up the user. However, the identifier/fingerprint and/or the token used for the step-up may also be associated with a time for the recent step-up of user data and authentication information. If the user identifier us detected and/or received again by the CTML within a certain time period later, then step-up authentication of the user may not be required. For example, if the user re-enters a communication channel or utilizes another communication channel within a short amount of time later than an initial step-up, another step-up in the new communication may not be required. A risk component may calculate a risk score or value based on the recency of the step-up previously performed by the user, a registered device fingerprint or identifier, a same or similar voice tone or print of the user in the call, a matching geo-location, and whether the channels are the same, similar, or related through cross-recommendations. If the risk score is below or meets a risk threshold, the step-up may be automatically differed due to trust in the user's similar identity based on the risk score. The risk score may also be calculated to determine whether to share tokenized data with other channels and/or risk scores based on the recency of the user's previously authorized step-up, and may prevent or allow the CTML to process detokenization requests for user data when receiving a token from a channel and/or service provider. The risk score may also be recalculated after subsequent step-up procedures and provided user data for authentication, for example, by requiring additional user data for a second step-up after a first where the first does not provide sufficient or entire user data, but reducing or ending the step-up requirement for any additional step-ups during the communication or another communication. This may generate an authorized user step-up token that may track the user through the communication and other communication channels to eliminate the step-up requirement. In other embodiments, the token may instead be utilized for authentication, which may include a step-up of authentication or an initial authentication, for example, if the user has yet to be authenticated. Thus, the processes described herein may be utilized for an initial authentication and/or subsequent authentication "step-ups" as required.

In some embodiments, a voice authentication token may be issued based on a provided voice data to perform authentication, step-up, or other confirmation of the user identity (e.g., in response to a CAPTCHA-like test to confirm that the user is not a bot). User identity details and/or a voice pattern/tone may be provided during a communication, which may be encrypted communications with the system, and/or through a registered voice authentication application. A static voice authentication token may be issued to the voice data, which may be stored by the CTML or other data tokenization system. The voice authentication token may be stored on the device and/or may be stored by the service provider and retrieved using an identifier/fingerprint when the user contacts the service provider system. Thus, the voice authentication token may be associated with the stream of the user's voice. When the user is requested to perform a voice authentication step-up, such as through an IVR system, the voice authentication token may be retrieved and the voice data may be provided without requiring the user to provide a voice tone, pattern, or speech. This may be performed through background operations so that the user may be authenticated without hearing the query and/or providing the voice data.

In some embodiments, a token may also be issued to the user by the CTML or another tokenization system for the user's position in queue of the communication channel, which links the user to the user's present status in a queue. The queue may be associated with time and position until the user is assisted in the communication channel. For example, during peak times, a communication channel may be handling many help or data processing requests, which are handled in order and a queue is formed. The token may therefore have a time that the user contacts the system, a present time, and an order or number of the user's place in the queue. The user may be provided with one or more interfaces of a marketplace or portal that may allow the user to exchange, sell, or receive real or virtual value for the user's token and allow users to exchange tokens, thereby exchanging positions based on their time of entry to the queue. A first user may sell their token to another second user, which causes the token to be provided to the second user. The first user may be assigned a new token, such as at the end of the queue and at the time of sale of the token, or may exchange their token with the second user's token. In some embodiments, real value may be exchanged. However, virtual items and/or value may also be exchanged, such as an option to advance in a later or subsequent queue if the first user provides their token to the second user.

Thus, the present system provides a process to reduce data processing requirements and authentication input and processing, while increasing resolution speed of communications within service provider communication channels. Users may navigate or surf between multiple platforms and/or service providers without being required to go through length authentication step-up procedures, which consumes unnecessary network bandwidth and server/device data processing availability. Additionally, the service providers' communication pathways may be streamlined so that data may be transferred between pathways using a CTML that unites the service providers for shared data processing and authentication. Thus, the service provider's server is not required to perform duplicate processing and instead is able to operate on a single data token allowing the service provider to skip unnecessary processing steps. All of this results in improved server performance and processing speeds while reducing processing and resolution times.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a service provider server 130, and tenant service provider server 140 in communication over a network 150. User device 110 may be utilized to access the various features available for user device 110, which may include processes and/or applications associated with service provider server 130 to tokenize user authentication data and provide a CTML with service provider server 130 to automatically authenticate the user during additional communications with service provider server 130. In some embodiments, service provider server 130 may provide the CTML for other tenant service providers, such as tenant service provider server 140, which may be used to authenticate the user during communications.

User device 110, service provider server 130, and tenant service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with service provider server 130, and/or tenant service provider server 140. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. User device 110 may correspond to a device of a consumer or customer that accesses service provider server 130 for issue resolution. Although only one communication device is shown, a plurality of communication devices may function similarly.

User device 110 of FIG. 1 contains a service application 112, other applications 114, a database 116, and a network interface component 118. Service application 112 and other applications 114 may correspond to executable processes, procedures, and/or applications with associated hardware. In other embodiments, user device 110 may include additional or different modules having specialized hardware and/or software as required.

Service application 112 may correspond to one or more processes to execute software modules and associated devices of user device 110 to access an online platform provided by service provider server 130 that provides help assistance, data management, and/or service processing. In this regard, service application 112 may correspond to specialized hardware and/or software utilized by a user of user device 110 to access a platform provided by service provider server 130 and provide a convenient interface to permit a user to browse information available over network 146 including accessing webpages, entering information from webpages, and navigating websites through webpages that provide help and assistance through the channels provided on the websites (e.g., a web-based chat channel, an online help desk, a browsable help resource or database, an IVR system, etc.). In certain embodiments, service application 112 may be implemented as a web browser configured to view information available over the Internet or access a website of a website provider, such as service provider server 130 and/or tenant service provider server 140. For example, service application 112 may be utilized to access websites and engage in online actions with service provider server 130 and/or tenant service provider server 140. Accessible websites may include those associated with a CTML provided by service provider server 130 that requires authentication data and step-up, which may be automated through the CTML.

In this regard, service application 112 may also be used to request assistance and/or data processing through a channel provided by service provider server 130 and/or tenant service provider server 140. In some embodiments, the process within service application 112 may access a platform provided by service provider server 120 and perform electronic transaction processing. Service application 112 may be utilized to transmit a transaction processing request to service provider server 120, which may include the transaction information and account information or another payment instrument. Service application 112 may also receive and/or provide transaction histories and/or results based on the transaction processing. In some embodiments, service application 112 may instead access a help platform.

During interaction in the channel, a step-up procedure may be required to be processed by service provider server 120, where the procedure may include a request for user data that may be tokenized after initial entry. If no token exists, service application 112 may be used to enter the user data, which may be transmitted to service provider server 120. If a token does exist for stored user data, service provider server 120 may process the authentication step-up request as discussed herein through a background operation, where service application 112 is not required to process, populate, and/or request data for the request. In this regard, the token may be determined using a device identifier, fingerprint, or other user identification data, which may be provided by service application 112. Additionally, service application 112 may receive a voice authentication token for voice data, and may store the token and voice data. Service application 112 may be used to provide the voice authentication token during a voice authentication process in the accessed channel. In some embodiments, service application 112 may also be used to view a marketplace or one or more channels to exchange tokens with other users, which may include purchase and/or sale of tokens for queue times or placements.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display devices capable of displaying information to users and other output devices, including speakers.

User device 110 may further include database 116 stored in a transitory and/or non-transitory memory of user device 110, which may store various applications and data and be utilized during execution of various modules of user device 110. Database 116 may include, for example, identifiers such as operating system registry entries, cookies associated with service application 112 and/or other applications 114, identifiers associated with hardware of user device 110, or other appropriate identifiers, such as identifiers used for payment/user/device authentication or identification, which may be communicated as identifying user device 110. Database 116 may include received tokens, including voice authentication tokens, as well as device identifiers and/or data for a device fingerprint or other data used to identify user device 110 and/or the user associated with user device 110.

User device 110 includes at least one network interface component 118 adapted to communicate with service provider server 130 and/or tenant service provider server 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 118 may communicate directly with nearby devices using short range communications, such as Bluetooth Low Energy, LTE Direct, WiFi, radio frequency, infrared, Bluetooth, and near field communications.

Service provider server 130 may be maintained, for example, by an online service provider, which may provide online services to customers through electronic devices, such as transaction processing services for payment of goods and/or services (e.g., items), digital wallet services, transfer services, and the like. In this regard, service provider server 130 includes one or more processing applications which may be configured to interact with user device 110, tenant service provider server 140, and/or another device/server to facilitate the online services, as well as provide automatic step-up of user authentication during communications associated with the online services. Thus, service provider server 130 may provide an online platform that provides communication channels, such as a website or other online resource accessible by user device 110. Service provider server 130 may be maintained by or include any type of service provider, which may sell items to users.

Service provider server 130 of FIG. 1 contains an automated step-up application 130, communication application 122, other applications 124, a database 126, and a network interface component 128. Automated step-up application 130, communication application 122, and other applications 124 may correspond to executable processes, procedures, and/or applications with associated hardware. In other embodiments, service provider server 130 may include additional or different modules having specialized hardware and/or software as required.

Automated step-up application 130 may correspond to one or more processes to execute modules and associated specialized hardware of service provider server 130 that interacts with an online platform for customer services to perform data tokenization of authentication data and automatic step-up during future authentication, where the customer services may be accessible through one or more communication channels provided by communication application 122 that provide a pathway for electronic communications with service provider server 130. In this regard, automated step-up application 130 may correspond to specialized hardware and/or software of service provider server 130 to provide a token management layer 132 that manages user data and automates authentication step-up using smart interoperable tokens and stored data. In order to provide token management layer 132, automated step-up application 130 may detect a communication from user device 110 through a communication channel, where the communication requires user data to authenticate the user and allow the user to perform some process or verify their identity. This may be referred to as an authentication or identity "step-up," which requires user data. The user data may include personal, financial, and/or authentication information, which may be input through user device 110 and received by automated step-up application 130.

After detecting the user data for the step-up process, token management layer 132 may be initiated to issue a token for the user data to user device 110, which may be associated with a user/device identifier or fingerprint that allows identification of the token and retrieval of the user data. The token may correspond to a randomized identifier, value, or other data that allows for reference to stored user data without disclosing the user data when the token is received or intercepted by a party, including bad actors. Token management layer 132 may issue the token with rules on token shared and delegation, which may limit the other service providers that may receive and/or utilize the token. In some embodiments, the rules may allow for use of the token with tenant service provider server 140 for automating step-up of user authentication. In some embodiments, the user data may correspond to voice data of the user associated with user device 110 and token management layer 132 may issue a voice authentication token to refer to that data, which may be stored with user device 110.

Another communication through the same or different channel, or step-up requirement in the same communication channel, may then be detected by automated step-up application 130. Token management layer 132 may be used to automate processing of the requirement without entry of user input. In some embodiments, the token may be provided to the new channel and/or step-up requirement, where the channel may use the token to process the requested step-up data in a background operation without user input. In some embodiments, the communication may be with another service provider, such as tenant service provider server 140. In such embodiments, token management layer 132 may process the token and automate step-up of the user in a channel with tenant service provider server 140 over network 150 based on rules for delegation of tokens and sharing of data between tenants of token management layer 132. Token management layer 132 may also calculate a risk in bypassing a step-up procedure or request based on a recency of a past authentication step-up performed by service provider server 120, and may bypass the step up if a risk score is low enough. The risk score may be based on the time between the step-up previously performed and the requested step-up of authentication data, a device fingerprint or matching device, a same or similar communication channel used, a user voice print, or other data that may indicate that the same user is involved in the communication requiring the step-up.

Similarly, where user device 110 may navigate between different communication channels, a session identifier may be used as the token or associated with an automatic step-up token for user data by token management layer 132, and the session identifier may be moved with user device 110 between the different channels. The session identifier may then be used to retrieve user data necessary for an authentication step-up in the next channel, and the next channel may automatically step-up the user using the session identifier, token, and user data without requiring the user to response to a request. Where the step-up requires voice data, token management layer 132 may provide, or retrieve from user device 110, a voice authentication token associated with voice data previously performed by the user. The voice authentication token may be used to provide the necessary voice data through a background operation without requiring the user to enter data. Token management layer 132 may also provide tokens that may be used to monitor, track, and exchange placement in a queue for users. In this regard, service provider server 13 may provide an online marketplace interface for users to visit to exchange tokens for placements in a queue for an electronic communication channel provided by communication application 122. The tokens may refer to a time of entry and/or placement in the queue, and may be exchanged for value using token management layer 132.

Communication application 122 may correspond to available electronic data transfer pathways for the use of sending and receiving data, which may include authentication processes a step-up required that are processed by automated step-up application 130. Communication application 122 may be used by user device 110 to interact with service provider server 130 and may correspond to application-based, web-based, and/or voice data-based communication channels that allow a user to send and receive data between user device 110 and service provider server 130. For example, communication application 122 may include one or more of a PSTN, websites or other online resources available over the Internet or other WAN, a web-based chat or messaging service (including email), or other communication pathway. Communication application 122 may provide for webpages that are displayable through user device 110. In this regard, user device 110 may access one or more websites and view the webpages of the associated domain. The webpages may correspond to Hypertext Markup Language (HTML or similar XHTML and/or CSS) documents that may be accessed and transmitted using Hypertext Transfer Protocol (HTTP) by user device 110. In addition to providing the webpages, communication application 122 may provide IVR like interfaces. Each of communication application 122 may utilize a specific code or scripting language, or other data processing protocol, which may be separate or shared between channels. In this regard, as authentication and user information for stepping up the user's identity and/or authentication may be transferred between channels of communication application 122 using tokens provided by automated step-up application 130.

In various embodiments, service provider server 130 includes other applications 124 as may be desired in particular embodiments to provide features to service provider server 130. For example, other applications 124 may include security applications for implementing server-side security features, programmatic client applications for interfacing with appropriate application programming interfaces (APIs) over network 150, or other types of applications. Other applications 124 may include server interface applications for an online server platform that output data to one or more devices. For example, other applications 124 may contain software programs, executable by a processor, including a graphical user interface (GUI) configured to provide interface data for display on devices.

Service provider server 130 may further include database 126 stored in a transitory and/or non-transitory memory of service provider server 130, which may store various applications and data and be utilized during execution of various modules of service provider server 130. Database 126 may include, for example, identifiers such as operating system registry entries, cookies associated with automated step-up application 130 and/or other applications 124, identifiers associated with hardware of service provider server 130, or other appropriate identifiers, such as identifiers used for payment/user/device authentication or identification. In various embodiments, database 126 may include a tokenization reference database and look up tables, which may be used by token management layer 132 to issue tokens that refer to user data stored by service provider server 120 for automatically stepping up user authentication using the tokens. The tokenization reference database may refer to user data stored to database 126 so that the user data may be retrieved and/or processed using a token.

Service provider server 130 includes at least one network interface component 128 adapted to communicate with user device 110 and/or tenant service provider server 140 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Tenant service provider server 140 may be maintained, for example, by an online service provider, which may provide online services to customers through electronic devices. In this regard, tenant service provider server 140 includes one or more processing applications which may be configured to interact with user device 110, service provider server 130, and/or another device/server to facilitate authentication of users using a CTML provided by service provider server 130 during communications by the users with tenant service provider server 140. Thus, tenant service provider server 140 may provide an online platform providing communication channels. Tenant service provider server 140 may be maintained by or include any type of service provider, which may sell items to users.

Tenant service provider server 140 of FIG. 1 contains authentication application 142, which may correspond to executable processes, procedures, and/or applications with associated hardware. In other embodiments, tenant service provider server 140 may include additional or different modules having specialized hardware and/or software as required.

Authentication application 142 may correspond to one or more processes to execute modules and associated specialized hardware of tenant service provider server 140 that provide an online communication channel with which a user associated with user device 110 may use to interact with tenant service provider server 140. In this regard, authentication application 142 may correspond to specialized hardware and/or software of tenant service provider server 140 to provide the electronic communication channel and receive communications from user device 110. Based on one or more delegated rules for tokens used for automated authentication step-up processing, a token for user data provided by a user associated with user device 110 may be shared and/or utilized by authentication application 142 to perform automatic authentication of the user during the communications. The token may be shared with authentication application 142 by token management layer 132 of service provider server 120 based on the rules. The token may allow for tenant service provider server 140 to automatically process the step-up request without requiring the user to reenter user data. Instead, the token may be used with token management layer 132 to determine the user data, which may be processed with the step-up request. Authentication application 142 may do so through a background operation, where authentication application 142 may then provide the requested access, communications, and/or processing to user device 110.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
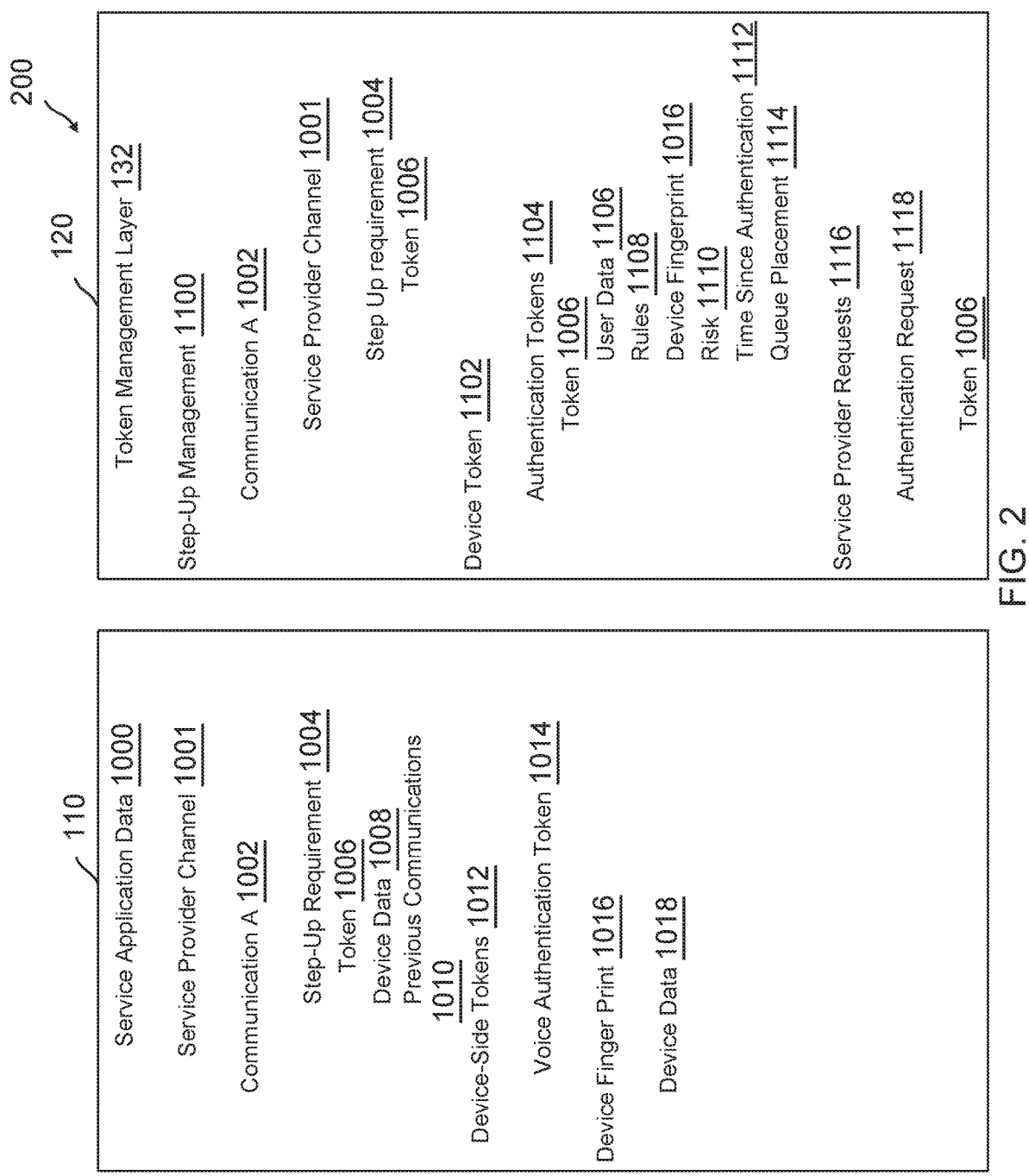
FIG. 2 is an exemplary system environment having a user device interacting with a service provider to automated authentication processing and step-up based on issued tokens, according to an embodiment.

FIG. 2 is an exemplary system environment having a user device interacting with a service provider to automated authentication processing and step-up based on issued tokens, according to an embodiment. System 200 of FIG. 2 includes user device 110 and service provider server 120 discussed in reference to system 100 of FIG. 1. In this regard, user device 110 and service provider server 120 may execute one or more processes to issue and process tokens that automate step-up of user authentication during electronic communications with a service.

User device 110 may execute an application, such as service application 112 in system 100, to communicate through a communication channel with a service provider, such as service provider server 120 and/or tenant service provider server 140. The application may generate service application data 1000 through the communications, which may include exchanged data with service provider server 120 to authenticate a user through tokenized user data previous provided to service provider server 120. For example, a service provider channel 1001 may be used to establish a communication A 1002 with service provider server 120. Service provider server 120 may utilize token management layer 120 to provide step-up management 1100 for communication A 1002 in service provider channel 1001. Step-up management 1100 may provide a process of token management layer 132 to determine whether a token is available for user device 110 that may be used to automate authentication requested during communication A 1002 by an authentication process in service provider channel 1001.

If the token is available, step-up management 1100 may utilize the token to retrieve user data necessary to authenticate the user during communication A 1002. For example, step-up requirement 1004 may be determined during communication A 1002, which requests personal, financial, and/or authentication information from user device 110 to be input during communication A 1002. Instead of requesting the user input the data, token management later 132 may utilize token 1006 to provide the required step-up data. Token 1006 may be determined from various device identifiers and data, such as device data 1008 that allows token management layer 132 to identify tokenized data based on a data token assigned to user device 110 and/or the user associated with user device 110. In some embodiments, token 1006 may be generated based on previous communications 1010, such as one or more previous contacts with service provider server 120 where the user entered the user data and was assigned token 1006.

Token management layer 132 may manage multiple device tokens 1102 for user device 110 and/or other user devices. Authentication tokens 1104 may refer to user data for one or more user devices used to perform step-up of authentication data in a background operation so that a user is not burdened with entering additional data and user device 110 with service provider server 120 may reduce authentication data processing for new entry of user data. Token 1006 of authentication tokens 1104 may be associated with user data 1106 that may be provided to perform the authentication step-up when token 1006 is detokenized through token management layer 132. Additionally, rules 1108 may control the privileges, data sharing controls and rights, and delegation of token 1006. A device fingerprint 1016 may be used to identify token 1006 when user device 110 communicates with a service provider through a channel and provide the token to the communication channel for use in stepping up the user's authentication when the channel requires user data 1106. Device fingerprint 1016 may be generate at least in part using device data 1018.

In some embodiments, additional information may be stored and/or utilized with token 1006. For example, a risk 1110 may include a risk score calculated based on time since authentication 1112 and other factors (e.g., device familiarity, registered device/user identification, voice patterns, etc.) to determine whether step-up of a user can be averted based on a low risk that the user is not who they say they are (e.g., that the user can be confirmed as being the same user with a high degree of confidence). Token management layer 132 may also provide a queue placement 1114 data and/or token to user device 110, which may allow a user to transfer queue position with other users through a marketplace that allows buying and selling of queue placement 1114 through a token assigned to queue placement 1114. Token management layer 132 may also manage step-up requirements by other service providers. For example, service provider requests 1116 may be received from other service providers, which may include an authentication request 1118 having token 1006 that was made available to the corresponding service provider based on rules 1108 and token management layer 132. Token 1006 may then be processed to automatically provide user data 1106 for authentication request 1118. Additionally, user device 110 may store device-side tokens 1012 with service application data 1000, such as a voice authentication token 1014 that control voice authentication of the user through a stored voice, voice data or pattern, and/or speech of the user.

Figure 3:
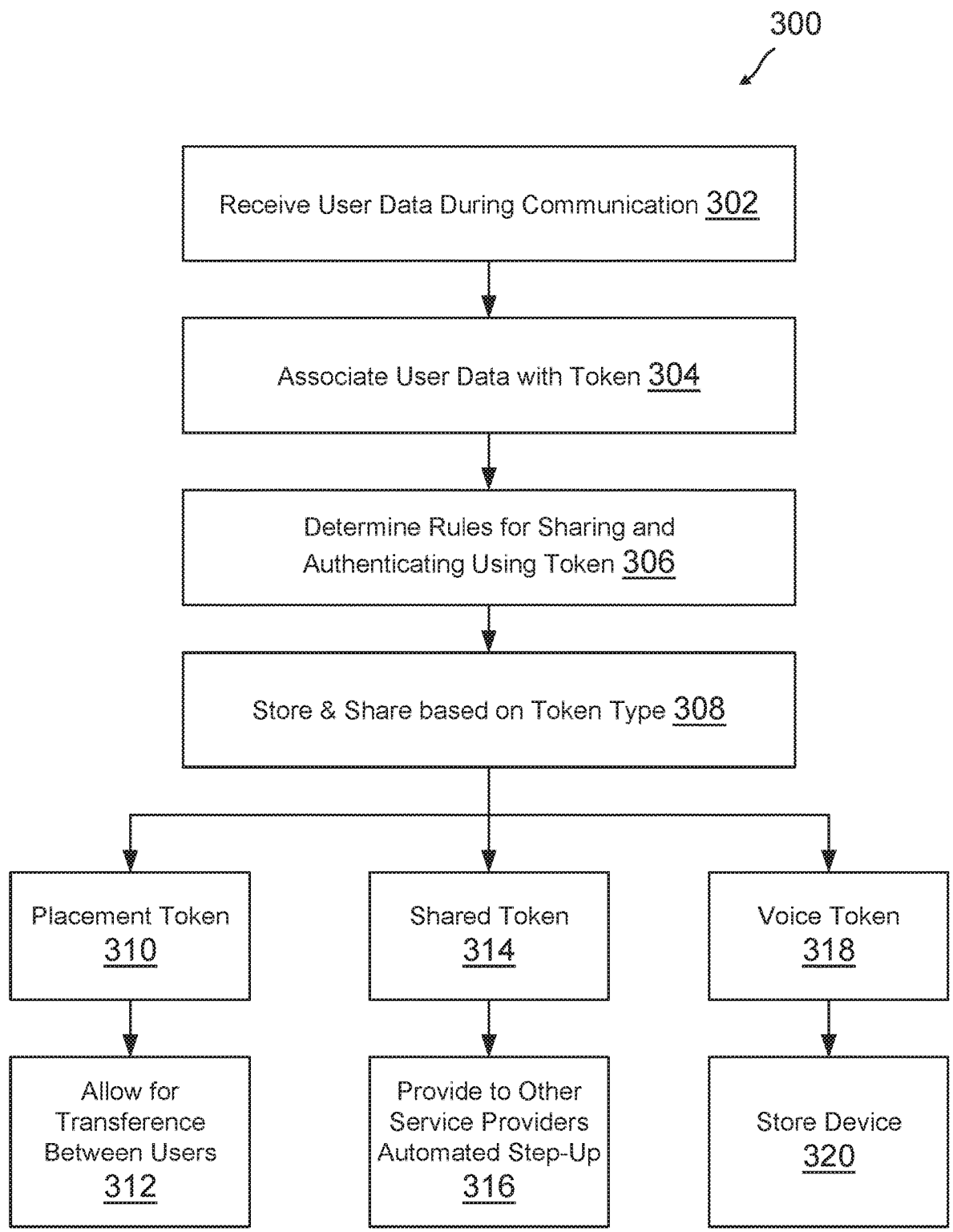
FIG. 3 is an exemplary flowchart for generating smart tokens to perform automated authentication of users during electronic communications, according to an embodiment.

FIG. 3 is an exemplary flowchart for generating smart tokens to perform automated authentication of users during electronic communications, according to an embodiment. Note that one or more steps, processes, and methods of flowchart 300 described herein may be omitted, performed in a different sequence, or combined as desired or appropriate.

Flowchart 300 displays an exemplary process to generate and store one or more authentication tokens utilized for automatic step-up of user authentication during a communication through a service provider's communication channel. In this regard, flowchart 300 may be executed by a CTML, such as token management layer 132 of system 100, in order to issue and manage tokens utilized for step-up user authentication and/or identification during communications by a user with a service provider. At step 302 of flowchart 300, user data is received during a communication, which may correspond to user personal, financial, or authentication data user to verify the user's identity and/or information, otherwise known as a "step-up" of the user's authentication or verification with a system communicating with the user. This user data may be utilized as an initial step-up where the user has not previously been issued a token for their information. In other embodiments, the user data may be received, pulled, or determined using another resource, such as an online account, other service provider, or online data. The user data may also correspond to data determined from the user's present communication with the system, such as a placement in a queue and/or time of entry to the queue.

At step 304, the user data becomes associated with a token after the token is issued by the CTML for the user data. The CTML may issue the token to tokenize the user data and prevent unauthorized viewing, receipt, or tampering with the user data. Thus, the CTML may provide a tokenization system that assigns randomized alphanumeric or other data tokens to data so that the tokenization system may store the data securely and only provide the data to and/or process with authorized parties on receipt of the tokens. The CTML may issue the token while updating a referential database for the token and data so that the data may be determined from the token. Additionally, the token may be associated with a device identifier, fingerprint, or other user/device information, which may be used to determine the token stored by the CTML, a communication channel, and/or the service provider when the user's device communicates with the channel and service provider.

The CTML also determines and issue rules for delegation of the token and data sharing, at step 306, where the rules define the service providers that may receive the token and when/where the user data may be shared for automating step-up during a communication by the user with the service provider. Once the token has been issued with the corresponding rules, the token is stored and shared based on the token type, at step 308. This may include sharing the token with other devices and/or service providers depending on the rules determined at step 306. For example, where the CTML determines that the token may correspond to a placement token in a queue at step 310, then at step 312 the CTML may allow for transference of the token between users. This may be done through a process, marketplace, or other online portal that provides an interface for users to view other available tokens of queue placement and trade, purchase, or sell tokens to exchange placements within the queue.

If the token is determined to correspond to a shared token, at step 314, the service provider may determine that the token may be shared with other service providers depending on the rules for that particular token that govern sharing of the token and user data. The shared token may be used to automate step-up of the user's authentication, credentials, and/or identity using the CTML. In this regard, when a service provider that utilizes the CTML receives a communication from the user's device and the token may be used as an identifier, the token may be utilized by the communication channel when step-up is required to automate step-up of the user's data using the token and the CTML. The token may be provided to the CTML and the user's data may be determined and used for step-up. The token may be used by the service provider that provides the CTML, or another service provider. However, if the token is determined to correspond to a voice authentication token associated with user voice data at step 318, then the CTML may store the token on the user's device. The voice token may then be provided by the user's device during a communication to step-up the user for a required voice authentication instead of requiring the user to recite some words, speech, or other voice data. This may be performed through a background operation in response to detecting a voice authentication query by having the device send the token and/or utilize the token to provide the voice data to the communication channel.

Figure 4A:
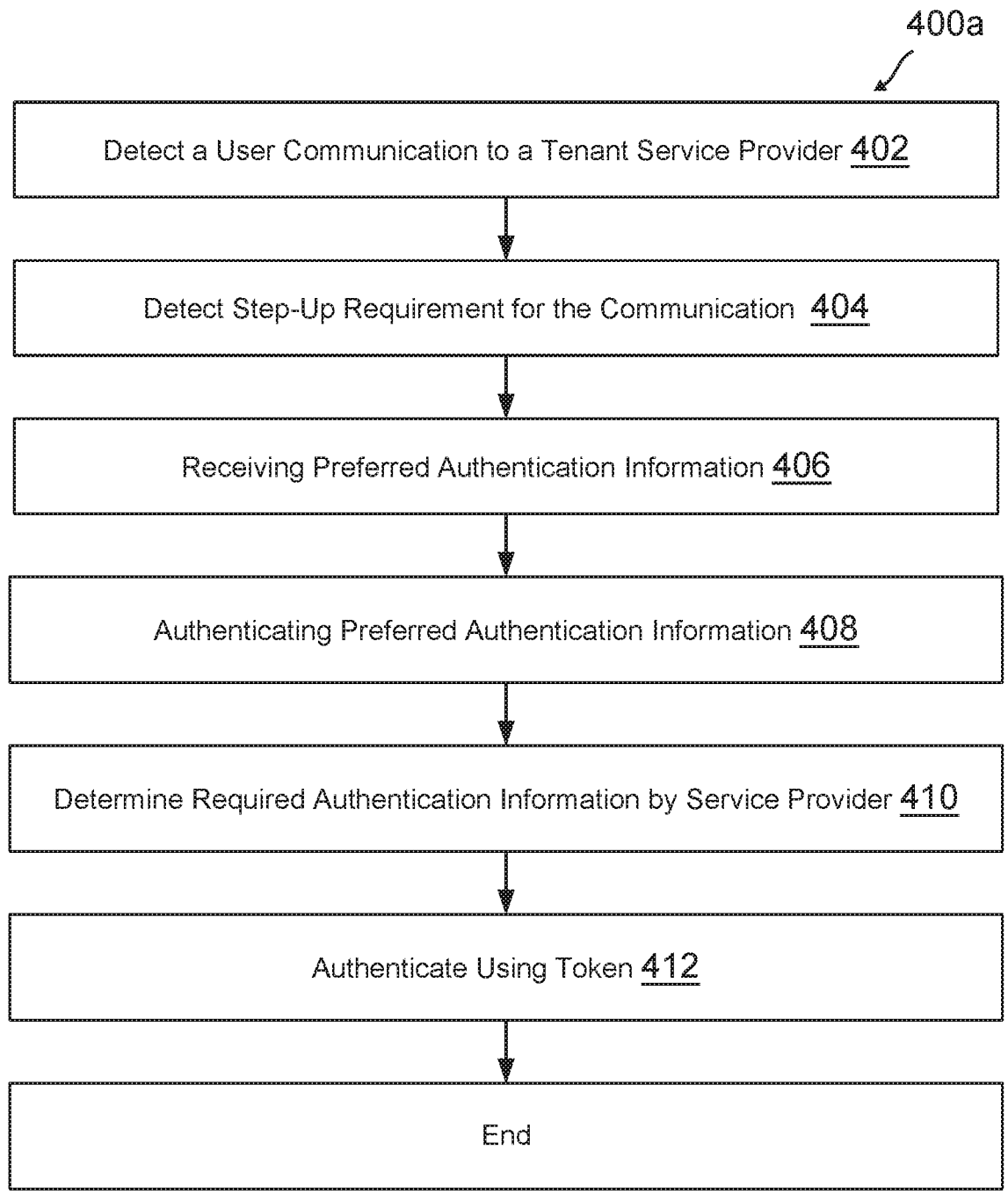
FIG. 4A is an exemplary flowchart to automate authenticating of users during electronic communications with tenant service providers of a CTML, according to an embodiment.

FIG. 4A is an exemplary flowchart to automate authenticating of users during electronic communications with tenant service providers of a CTML, according to an embodiment. Note that one or more steps, processes, and methods of flowchart 400a described herein may be omitted, performed in a different sequence, or combined as desired or appropriate.

Flowchart 400a displays an exemplary process to determine and provide one or more authentication tokens utilized for automatic step-up of user authentication during a communication through a service provider's communication channel. In this regard, flowchart 400a may be executed by a CTML, such as token management layer 132 of system 100, in order to provide tokens, detect communications, and process the tokens for step-up of user authentication and/or identification during communications by a user with a service provider. At step 402 of flowchart 400a, a user communication to another tenant service provider separate from the CTML is detected, which may correspond to a communication through a communication channel of a tenant service provider that utilizes the CTML for automated step-up. For example, a separate service provider may be a tenant for the CTML and enroll in use of the CTML for automatic step-up of user authentication and/or identity through tokens provided by the CTML during communications by the user with the service provider.

At step 404, a step-up requirement and/or request is detected during the communication between the tenant service provider and the user. Thus, the CTML may determine that the communication requires an authentication step-up during the communication, for example, to provide a user with access and/or processing by verifying the identity of the user and insuring they know or have access to sensitive information. The authentication step-up may therefore allow the user to proceed with sensitive or privileged communications and/or processes. The step-up request or other authentication request may be detected from a token issued for the step-up request by the corresponding channel and/or tenant service provider, and may further include metadata, step-up requirements, and other information necessary to process the tokenized request. The CTML may also validate and verify the tenant as being a proper tenant and may check delegation and data sharing rules to determine whether the tenant may receive step-up data from the CTML for automated step-up. In one or more embodiments, the CTML may be triggered to perform the steps of FIG. 4a based on detecting the step-up authentication request from the tenant service provider.

At step 406, preferred authentication information is received from the user. For example, the user may prefer to authenticate themselves using a voice utterance or pattern, a fingerprint, or other piece of data (e.g., personal/financial data). However, the step-up by the tenant service provider may require other types of data. Thus, the user may provide the preferred step-up mechanism to the CTML. In other embodiments, the CTML may prompt the user for the preferred authentication information. In these other embodiments, the CTML may reference a database (storing authentication data of a plurality of users) to identify the preferred authentication information corresponding to the user and then prompt the user to provide the preferred authentication information so it may be verified.

The CTML then authenticates and verifies the received preferred authentication information, at step 408, for example, by checking it against the stored preferred authentication information in the database. The database of data may include data associated with the user's preferred authentication information, such as one or more additional types of authentication tokens (corresponding to one or more types of authentication information) that has previously been stored and/or used for authentication step-up. The database may also include other user data, such as account data for a user account. The CTML may determine the user's available user data and the token based on the preferred authentication data received by the CTML. The token may also be accessed through a device identifier or fingerprint of the device communicating with the separate service provider. The token may be detokenized to determine user data and other information necessary to step-up the user's authentication with the separate tenant service provider. In additional embodiments, the CTML may not determine the specific user corresponding to the tenant request when the request is detected, and in these additional embodiments, the CTML may utilize the preferred authentication information received from the user to identify the specific user information in the database (user record within the database) that corresponds to the preferred authentication information. For example, the CTML may check a fingerprint received from the user (the preferred authentication information) against all fingerprints in the database to identify the specific user.

The required step-up authentication information (and corresponding authentication token) requested by the tenant service provider is determined, at step 410, which may include determining the required user data or other information necessary for the step-up of the user with the tenant service provider. This step-up data may be separate and different from the preferred step-up data provided by the user. The required authentication information may be particular to the tenant and communication channel requiring the step-up of the user's authentication. In some embodiments, the CTML may verify the parameters of the step-up request, such as the proper data format, authentication process, and/or data sharing rule. At step 412, the CTML then transmits the determined authentication token (corresponding to the tenant's request) to the tenant service provider so as to cause the user to be stepped up. In one or more embodiments, the token may be transmitted via the tenant service provider's communication channel. In some embodiments, the token and/or user data may be encrypted, transmitted to the separate service provider, and processed to step-up the user in the communication channel of the separate service provider. However, the CTML and the separate service provider may also have one or more back-end secure communication channels for data exchange or trust agreements that allow for stepping up the user's authentication with the separate service provider by the CTML without exchange of the sensitive user data.

Figure 4B:
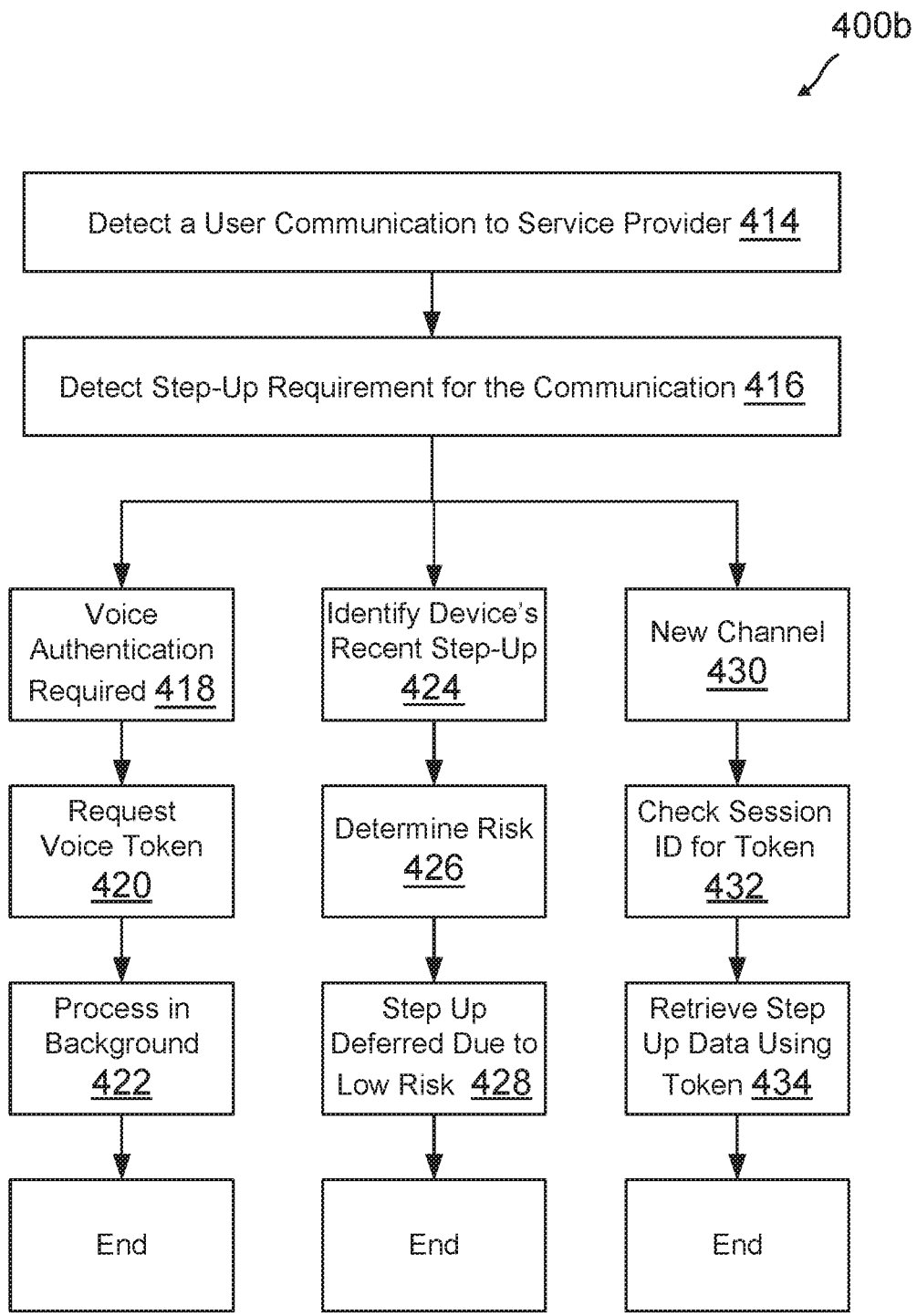
FIG. 4B is an exemplary flowchart to automate authenticating of users during electronic communications with a service provider providing a CTML, according to an embodiment.

FIG. 4B is an exemplary flowchart to automate authenticating of users during electronic communications with a service provider providing a CTML, according to an embodiment. Note that one or more steps, processes, and methods of flowchart 400b described herein may be omitted, performed in a different sequence, or combined as desired or appropriate.

Flowchart 400b displays an exemplary process to provide automated step-up using stored user tokens with a service provider's CTML. In this regard, flowchart 400b may be executed by a CTML, such as token management layer 132 of system 100, in order to provide tokens, detect communications, and process the tokens for step-up of user authentication and/or identification during communications by a user with a service provider. At step 414 of flowchart 400a, a user communication to the service provider is detected, which may correspond to a communication through a communication channel of the service provider. At step 416, a step-up requirement and/or request is detected during the communication between the service provider and the user. This step-up requirement may correspond to a detected process that is or will query the user for particular authentication information. The step-up request may be determined from a token issued for the step-up request and processed by the CTML with the communication channel. If the CTML determines that voice authentication of the user is required, at step 418, the CTML may request a voice data token for voice data of the user, at step 420. The voice data token may be stored on the user's device and may enable playback the data from the device or CTML storage in response to the required voice authentication in a background operation, at step 422. The CTML may also store the voice authentication token and may retrieve the voice authentication token using a device identifier or fingerprint utilized in the communications with the service provider associated with the CTML. The CTML may discreetly playback or provide the voice data associated with the token to the voice authentication step-up process in the communication channel, and may step-up the user without requiring the user to vocally respond to the step-up request. Once authenticated, flowchart 400b may end.

In some embodiments, the CTML may also determine that a recent step-up for the user has been performed, and, in response to this recent step-up, the CTML may identify the device's recent step-up, at step 424, which may include determining whether the device identifier, fingerprint, and/or registration exists with the recent step-up. The CTML may utilize this data with additional risk data, such as a voice pattern of the user, geo-location, etc., to run a risk assessment and determine whether the authentication step-up is necessary. If the user has previously provided sufficient information through one or more recent step-ups, the user may be automatically stepped up and/or defer the requested step-up due to the low risk at or below a threshold amount of risk, at step 428.

A new channel that a device is guided to may also be detected by the CTML, at step 430. The new channel may require new, independent, and/or repeated step-up of the user's authentication. In order to prevent repeated step-ups by the user, the CTML make check whether the session identifier of communications with the service provider in the new channel matches or is associated with a previous channel based on the transfer, at step 432. This may include determining whether the session identifier is associated with a token or with tokenized data using the session identifier, such as user data used for stepping up a user in the previous channel. If so, the session identifier may be used to retrieve the necessary step-up data, at step 434, and the CTML may perform user step-up using the retrieved data. Once the user is authenticated, flowchart 400b may end or continue through another branch depending on the required step-up for a communication channel.

Figure 5:
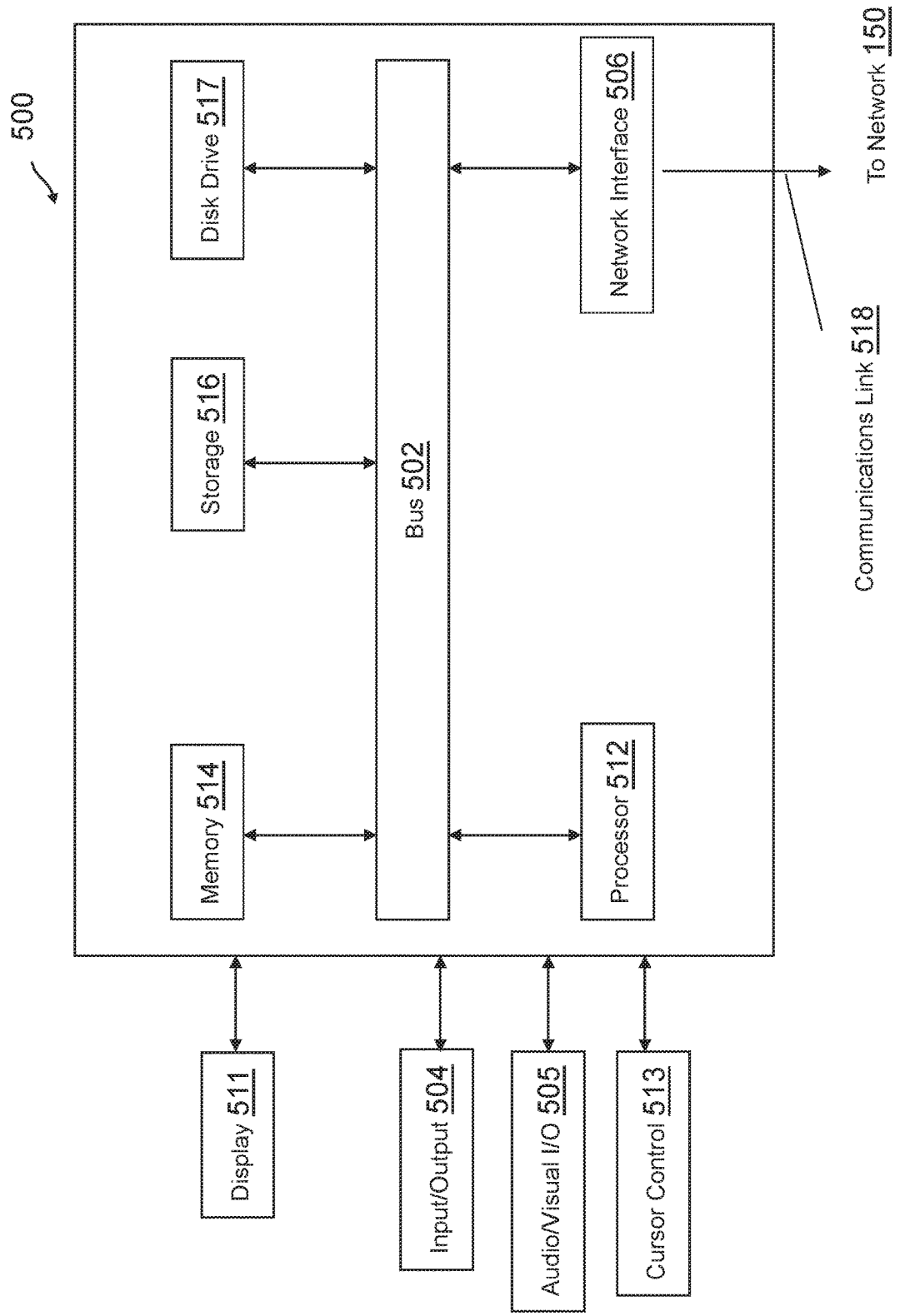
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system of a first service provider comprising:
a non-transitory memory storing instructions; and
one or more hardware processors coupled to the non-transitory memory and configured to read the instructions from the non-transitory memory to cause the system to perform operations comprising:
determining that a process associated with a first communication channel of a second service provider requires a first type of authentication information from the first service provider to authenticate a user;
determining a second type of authentication information available to the user that enables an authentication of the user during the process, wherein the second type of authentication information is a preferred type of authentication information for the user for the authentication during the process, and wherein the first type of authentication information and the second type of authentication information were received through a second communication channel of the second service provider, the first communication channel and the second communication channel being different types of communication channels;
determining that the second type of authentication information is available from a database accessible by the system;
prompting the user for the second type of authentication information during the process;
receiving, during the process and via the first communication channel, the second type of authentication information for the authentication from the user during the process;
determining a token that enables the authentication for the process in the first communication channel, wherein the token contains user data that corresponds to the first type of authentication information with the first service provider; and
transmitting the token to the second service provider at least in part by translating the user data into a processing language or a data structure type that is compatible with the first communication channel.

2. The system of claim 1, wherein prior to determining that the process requires the first type of authentication information, the operations further comprise:
associating the second type of authentication information with the preferred type of authentication information for the token.

3. The system of claim 2, further comprising a common token management layer that provides token issuance for the token and data storage for the first type of authentication information and the second type of authentication information, wherein the common token management layer further provides detokenization of the token with the second service provider, wherein the detokenization further comprises the translating the user data.

4. The system of claim 3, wherein the operations further comprise:
issuing the token to the user using the common token management layer, wherein at least one of the first type of authentication information or the second type of authentication information is associated with the token in response to the issuing the token; and
storing the token and the at least one of the first type of authentication information or the second type of authentication information by the common token management layer.

5. The system of claim 1, wherein prior to transmitting the token, the operations further comprise:
verifying the second type of authentication information based on the token and data from the database.

6. The system of claim 1, wherein the process comprises an authentication request for an identity of the user, wherein the first type of authentication information comprises required authentication information for the authentication request, and wherein one of the first communication channel or the second communication channel comprises an interactive voice response (IVR), while another one of the first communication channel or the second communication channel comprises an electronic chat.

7. The system of claim 1, wherein the operations further comprise:
determining a data sharing rule for the first type of authentication information with the second service provider;
determining that the data sharing rule allows sharing of the first type of authentication information with the second service provider; and
prompting the user for the second type of authentication information in response to determining that the data sharing rule allows the sharing.

8. A method comprising:
detecting, by a first service provider, an authentication of first user information for a user in a first channel of the first service provider based on the user providing the first user information in the first channel;
issuing, by the first service provider, a token to the user, wherein the token contains at least the first user information;
receiving second user information for the user, wherein the second user information comprises preferred authentication information provided by the user that enables an authentication of the user during an authentication request with a second service provider;
storing, by the first service provider, the token with the first user information and the second user information by a token management system accessible by the first service provider;
detecting an authentication request for the first user information from the second service provider;
determining that the second user information is the preferred authentication information for the authentication request;
prompting the user for the second user information via a second channel of the first service provider that is different from the first channel;
receiving the second user information from the user via the second channel; and processing the authentication request with the second service provider using the token, wherein the processing the authentication request further comprises translating the first user information in the token into a processing language or a data structure type that is compatible with the second channel.

9. The method of claim 8, wherein the second user information is substituted by the user for entry of the first user information during the authentication request.

10. The method of claim 9, further comprising:
validating the authentication request with the second service provider; and
authenticating the user for processing the authentication request based on the second user information.

11. The method of claim 8, further comprising:
accessing, by the first service provider, the token management system for detokenization of the token to retrieve the first user information, wherein the token management system comprises a management layer of the first service provider for token issuance of the token, data caching of the first user information and the second user information, and a rule for data sharing using the token.

12. The method of claim 11, wherein processing the authentication request comprises sharing the token with the second service provider based on the rule, wherein the second service provider utilizes a third channel for communication with the user.

13. The method of claim 12, wherein the token is shared with the second service provider in response to detecting a use of the third channel by the user.

14. The method of claim 8, wherein the first user information and the second user information comprise at least one of a username, a password, an address, at least a portion of alphanumeric characters of a payment card, a fingerprint, a voice utterance, or at least a portion of financial information.

15. A non-transitory machine-readable medium having stored thereon machine-readable instructions executable to cause a machine to perform operations comprising:
receiving first user information for a user during a first communication through a first communication channel of a service provider;
determining second user information for the user that enables an authentication of the user, wherein the second user information comprises preferred user information for the user for the authentication of the user;
generating a token associated with at least the first user information and the second user information using a token management service accessible by the service provider;
storing the token for the user by the token management service;
detecting a second communication by the user through a second communication channel of the service provider that is a different type of communication channel than the first communication channel;
determining that the second user information is the preferred user information for the authentication of the user in the second communication channel;
prompting the user for the second user information;
receiving the second user information from the user; and
providing the token to the second communication channel for the authentication of the user at least in part by translating the first user information or the second user information into a processing language or a data structure type that is compatible with the second communication channel.

16. The non-transitory machine-readable medium of claim 15, wherein one of the first communication channel or the second communication channel comprises an interactive voice response (IVR), while another one of the first communication channel or the second communication channel comprises an electronic chat.

17. The non-transitory machine-readable medium of claim 15, wherein the token management service is accessible by a plurality of service providers, and wherein the operations further comprise:
providing the token to the plurality of service providers for the authentication of the user;
receiving an authentication step-up request from one of the plurality of service providers, wherein the authentication step-up request comprises the token; and
processing the authentication step-up request with the one of the plurality of service providers based on the token.

18. The non-transitory machine-readable medium of claim 17, wherein the operations further comprise:
determining a delegated rule for providing the token to the plurality of service providers; and
associating the delegated rule with the token stored by the token management service.

19. The non-transitory machine-readable medium of claim 15, wherein the operations further comprise:
determining an amount of time between the first communication and the second communication; and
determining a risk score for automatically providing the first user information or the second user information based on the amount of time,
wherein the token is provided in the second communication channel further based on the risk score.

20. The non-transitory machine-readable medium of claim 15, wherein the operations further comprise:
establishing a session identifier for a session corresponding to the first communication,
wherein the token comprises the session identifier.

* * * * *